United States Patent [19]

Dykes

[11] Patent Number: 4,704,883

[45] Date of Patent: Nov. 10, 1987

[54] KING PIN LOCK

[76] Inventor: James R. Dykes, 540 E. 60th St., Savannah, Ga. 31405

[21] Appl. No.: 822,650

[22] Filed: Jan. 27, 1986

[51] Int. Cl.$^4$ ............................................. F16B 41/00
[52] U.S. Cl. ...................................... 70/232; 70/229; 70/57
[58] Field of Search ...................... 70/57, 50, 14, 360, 70/229-232, 209, 57, 218-221; 280/433, 434, 438 R, 507

[56] References Cited

U.S. PATENT DOCUMENTS

| | | | |
|---|---|---|---|
| 1,662,612 | 3/1928 | Junkunc | 70/55 |
| 2,706,392 | 4/1955 | Lucas et al. | 70/232 |
| 2,755,655 | 7/1956 | Maffey | 70/232 |
| 2,785,564 | 3/1957 | Rossi | 70/232 |
| 3,415,085 | 12/1968 | Eble et al. | 70/232 |
| 3,600,914 | 8/1971 | Johnson | 70/232 |
| 3,763,675 | 10/1973 | Hofmeister et al. | 70/232 |
| 3,922,897 | 12/1975 | Mickelson | 70/232 |
| 4,031,727 | 6/1977 | DeGroat et al. | 70/232 |
| 4,141,233 | 2/1979 | Reyes | 70/232 |
| 4,553,415 | 11/1985 | Maffey | 70/232 |

FOREIGN PATENT DOCUMENTS 2725469 12/1978 Fed. Rep. of Germany ........ 70/231
2049587 12/1980 United Kingdom .................. 70/229

Primary Examiner—Robert L. Wolfe
Assistant Examiner—Suzanne L. Dino
Attorney, Agent, or Firm—Dority & Manning

[57] ABSTRACT

A trailer king pin lock for preventing theft of a trailer by negating connection of a trailer king pin with a tractor fifth wheel coupling. A sleeve is provided that is receivable about the trailer king pin. A locking unit housing, which extends radially relative to the sleeve, is attached to the sleeve and carries a locking cylinder for sliding movement therein. A bore is provided in the sleeve and is enclosed by the housing. The locking cylinder passes through the bore for insertion into an annular groove typically found in a trailer king pin. A radially extending locking cylinder retaining pin is carried by the locking cylinder and is outwardly extendable upon the turning of a key inserted into the locking cylinder. The outward extension of the locking cylinder retaining pin prevents extraction of the locking cylinder from the annular groove through the bore, thereby fixing the locking cylinder within the annular groove and retaining the king pin lock on the king pin against unauthorized attempts at removal therefrom.

6 Claims, 4 Drawing Figures

KING PIN LOCK

BACKGROUND OF THE INVENTION

The present invention relates to a locking device for preventing unauthorized insertion of a trailer king pin into a tractor fifth wheel coupling.

The conventional tractor-trailer hitch or coupling structure has been standardized so that practically any tractor can be coupled to any trailer. The conventional coupling structure includes a fifth wheel attached to the tractor and a downwardly extending king pin carried on the underside of the trailer, adjacent the front of the trailer. The fifth wheel is provided with a skid plate having an opening in which the king pin of the trailer is carried. The king pin has an annular groove which is engaged by movable jaws of the fifth wheel. The jaws on the fifth wheel engage the annular groove on the king pin of the trailer to pivotally secure the trailer to the tractor. When the king pin is locked into engagement with the fifth wheel, the trailer can be hauled by the tractor.

Often, when the destination of the trailer is reached, the trailer is uncoupled from the tractor to await unloading of its contents, reloading, storage or the like. There are thus many occasions when the trailers are left unattended. It is thus relatively simple for thieves to merely couple their own tractor to any unattended trailer and haul the trailer and its contents away. Such hijacking of trailers occurs frequently. Various locking means have been devised to prevent theft of trailers. For example, U.S. Pat. No. 2,554,306 granted to Mack for a "Theft Prevention Device for Tractor Drawn Trailers" discloses a king pin cover which is held to the king pin by the latch arm of a locking unit. U.S. Pat. No. 2,641,124 granted to Gallagher et al. for a "Lock for Fifth Wheel King Pins" discloses a king pin cover which is held to the king pin by a conventional padlock. U.S. Pat. No. 3,269,159 granted to Young for a "Theft Prevention Device for Trailers" discloses a hinged king pin cover having two ends which lock together.

Prior king pin locks, including those disclosed above have several disadvantages. Particularly, prior lock collar designs are generally not strong enough to resist a heavy blow from a sledge, for example, without being broken and thus, rendered useless. Other designs have required costly parts or are expensive to manufacture. Still other collar designs are difficult to install and remove by the user.

SUMMARY OF THE INVENTION

It is an object of the present invention to provide a device for preventing unauthorized insertion of a shaft into a receiving coupling, more specificaly, the insertion of a trailer king pin into a tractor fifth wheel.

Another object of the present invention is to provide a device for preventing unauthorized insertion of a trailer king pin into a tractor fifth wheel which is resistant to forceful external blows.

Still another object of the present invention is to provide an improved device for preventing unauthorized insertion of a king pin into a tractor fifth wheel.

Yet another object of the present invention is to provide a device for preventing unauthorized insertion of a trailer king pin into a tractor fifth wheel which is easy to install and remove by the user.

Generally, the present invention includes a locking device receivable about an annularly extending groove defined in a cylindrical trailer king pin for preventing insertion of the trailer king pin into a tractor fifth wheel coupling, comprising a housing defining a king pin-receiving opening therethrough; and locking means associated with said housing for movement into and out of said king pin-receiving opening; said locking means having lock-retaining means associated therewith; said lock-retaining means being movable to a retaining position when said locking means is located within said king pin-receiving opening to preclude the retraction of said locking means therefrom; so that when said king pin-receiving opening of said housing is received about the trailer king pin, said lock-retaining means is adjacent said annularly extending groove defined in the trailer king pin, said locking means being movable into the annularly extending groove and retainable therein by said lock-retaining means.

More specifically, the locking device of the present invention includes a cylindrical sleeve which is receivable about the king pin. A radially extending housing is located about the circumference of the sleeve at a location which is adjacent the annular groove of the king pin when the sleeve is placed thereon. A locking cylinder is received within the radially extending housing and is movable inwardly with respect to the housing for insertion into the annular groove of the king pin. When the locking cylinder is within the annular groove, a key received in the rearward end of the locking cylinder may be turned to force a locking pin out of the forward end of a locking cylinder into contact with the inside surface of the sleeve. The locking pin prevents removal of the forward end of the locking cylinder from the interior of the sleeve, thereby locking the locking cylinder within the annular groove of the king pin. A protective rubber casing may be provided to enclose the sleeve and the housing for added protection against heavy blows delivered thereto during an attempted theft of the trailer.

In the preferred embodiment of the present invention, a triangular support web, spanning between the housing and the side wall of the sleeve, is provided to discourage attempts at prying the king pin lock from the king pin by the use of a pry bar against the housing. In another embodiment, the housing is in the shape of a truncated cone or frustum to also discourage attempts at prying the king pin lock from the king pin through contact of a pry bar with the locking cylinder housing. Still another embodiment of the present invention includes a sleeve of sufficient thickness such that the need for the locking cylinder housing is eliminated. When the locking cylinder is inserted into the annular groove of the king pin, the rearward end of the locking cylinder becomes flush with, or slightly indented relative to, the side wall of the sleeve.

BRIEF DESCRIPTION OF THE DRAWINGS

The foregoing as well as other objects of the present invention will be more apparent from the following detailed description of the preferred embodiment of the invention, when taken together with the accompanying drawings, in which.

DESCRIPTION OF THE INVENTION

Figure 1:
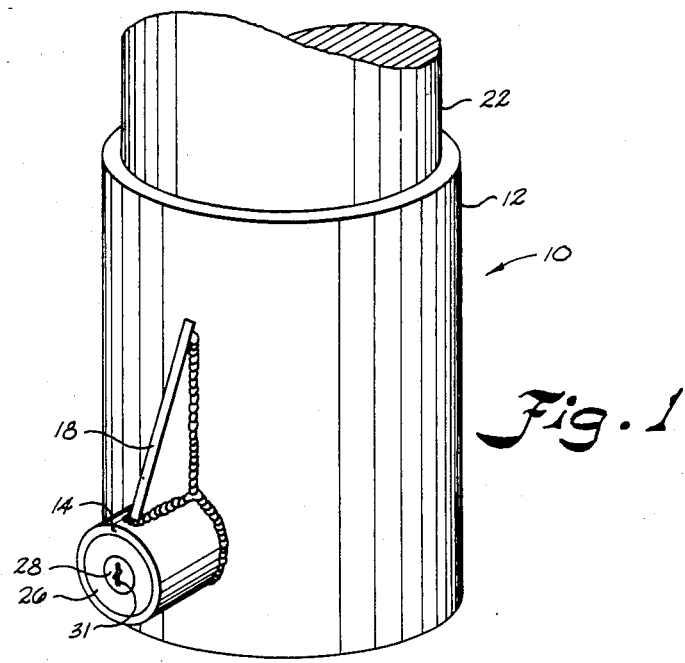
FIG. 1 is a perspective view of a preferred form of a king pin lock constructed in accordance with the present invention.

Referring to the drawings in detail, wherein like reference characters represent like elements throughout the various views, the king pin lock of the present invention is designated generally by the reference character 10. King pin lock 10 includes a cylindrical sleeve 12, a cylindrical housing 14 radially disposed about cylindrical sleeve 12, a cylindrical locking cylinder or unit 16 carried for sliding movement within housing 14 and a triangular support web 18 extending between housing 14 and the side wall 20 of cylindrical sleeve 12.

FIG. 1 illustrates a preferred embodiment of the present king pin lock 10 and is shown encompassing a stardard-sized trailer king pin 22. The inner diameter of cylindrical sleeve 12 is such that cylindrical sleeve 12 may be placed around trailer king pin 22. Cylindrical sleeve 12 is preferably made from a strong, damage-resistant material such as steel. A radially extending bore 24 is provided in side wall 20 of cylindrical sleeve 12 for receipt of locking unit 16. Cylindrical housing 14 encircles bore 24 and is attached to cylindrical sleeve 12 by suitable means such as by welding. Housing 14 carries locking unit 16 within for sliding movement.

An endcap 26 is provided at the extreme end of housing 14 opposite where housing 14 attaches to side wall 20 of cylindrical sleeve 12. Endcap 26 completely covers the cylindrical opening of housing 14, except for a small keyhole 28 through which a conventional key 30 is inserted into locking unit key slot 31 to actuate locking unit 16. A retaining bolt or screw 32 is carried by housing 14 which extends into the interior of housing 14 and serves to retain locking unit 16 within housing 14 through sliding interaction with the interior of a longitudinally extending groove 34 provided in locking unit 16. Removal of retaining screw 32 allows expedient removal and replacement of locking unit 16.

Locking unit 16 is of conventional design and is generally cylindrical in shape. The interaction of retaining screw 32 within longitudinally extending groove 34 allows locking unit 16 to be slidingly advanced within housing 14 to and from trailer king pin 22 when cylindrical sleeve 12 is placed around trailer king pin 22. The interaction of retaining screw 32 in longitudinally extending groove 34 also prevents locking unit 16 from rotating within housing 14 when key 30 is turned within keyhole 28 to actuate a retaining pin 36 carried in locking unit 16.

Retaining pin 36 is carried completely within locking unit 16 when locking unit 16 is fully retracted in housing 14. The retraction of locking unit 16 within housing 14 allows for cylindrical sleeve 12 to be placed over trailer king pin 22.

Figure 2:
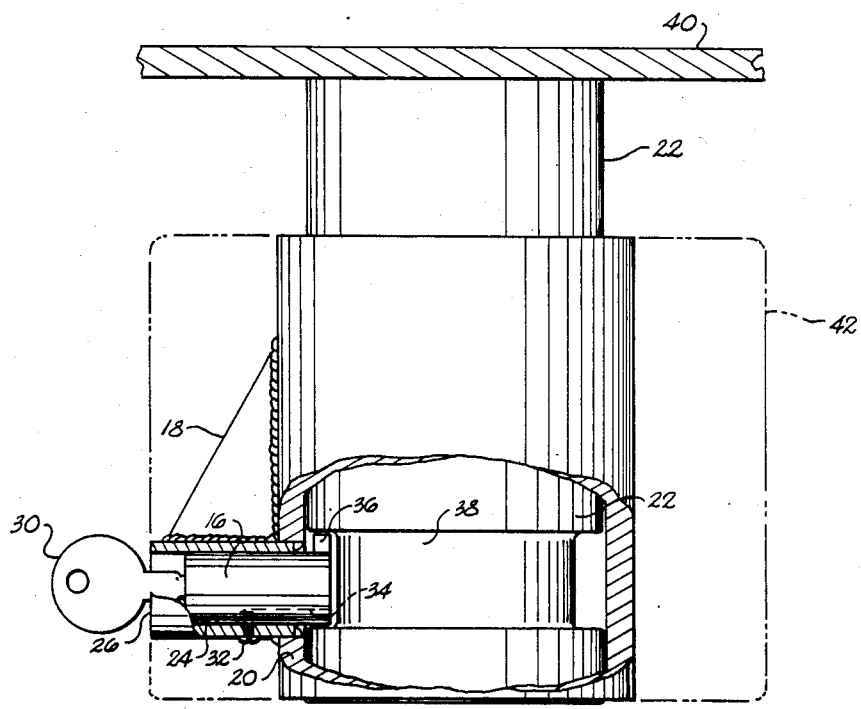
FIG. 2 is a side elevational view, with parts cut away, of a preferred form of a king pin lock constructed in accordance with the present invention.
Figure 3:
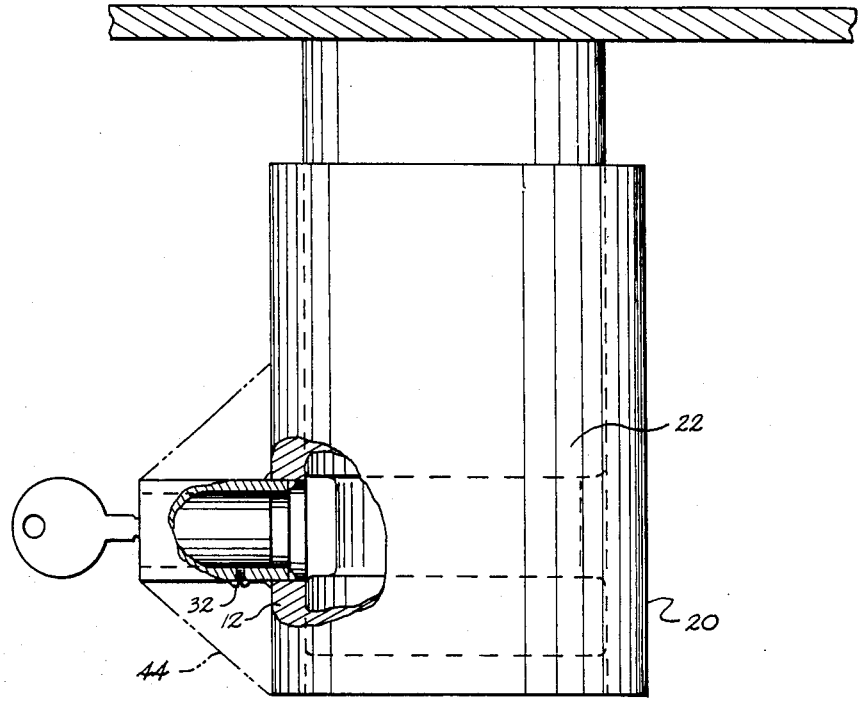
FIG. 3 is a side elevational view, with parts cut away, of an alternate embodiment of a king pin lock constructed in accordance with the present invention.

FIG. 2 illustrates locking unit 16 being in an advanced position, inserted into annular groove 38 of trailer king pin 22, which is supported by mounting plate 40 on the underside of a trailer. FIG. 3 illustrates locking unit 16 in a retracted position within housing 14.

Upon placement of cylindrical sleeve 12 over trailer king pin 22, key 30 is used to advance locking unit 16 into a standard-sized annular groove 38 typically found in a trailer king pin 22. Upon insertion of locking unit 16 into annular groove 38, key 30 is turned to actuate retaining pin 36, causing retaining pin 36 to extend radially outward from locking unit 16. Key 30 is then removed from locking unit 16, thereby securing king pin lock 10 to the trailer king pin 22. The outward radial extension of retaining pin 36 from locking unit 16, caused by the turning of key 30 within key slot 31 of locking unit 16, prevents locking unit 16 from being extracted through bore 24 rearwardly into housing 14. The locking unit 16 thus prevents unauthorized removal of cylindrical sleeve 12 from trailer king pin 22 through the insertion thereof into annular groove 38.

The advancement of locking unit 16 inwardly into the annular groove 38 of trailer king pin 22 lessens the likelihood of the locking unit 16 being susceptible to heavy blows delivered to cylindrical sleeve 12 in an unauthorized attempt to remove king pin lock 10 from trailer king pin 22. The maintaining of cylindrical sleeve 12 on trailer king pin 22 allows king pin lock 10 to provide trailer king pin 22 with an additional diameter dimension which creates sufficient interference between king pin lock 22 and a tractor fifth wheel coupling (not shown) to negate insertion of trailer king pin 22 into the tractor fifth wheel coupling.

FIG. 2 illustrates the present king pin lock 10 provided with a protective casing 42. The casing 42 serves to dampen or absorb the forces delivered to king pin lock 10 by heavy external blows during an attempted theft of a trailer. Casing 42 can be made from rubber or another similar-type force-absorbent material such as plastic.

An alternate embodiment of the present king pin lock 10 is illustrated in FIG. 3 where instead of providing a cylindrical exterior for housing 14, a housing 44 is provided having a truncated cone-shaped, or frustum-shaped, exterior. The frustum shape of the housing 44 deters the use of a pry bar against housing 44 in attempts to destroy king pin lock 10.

Figure 4:
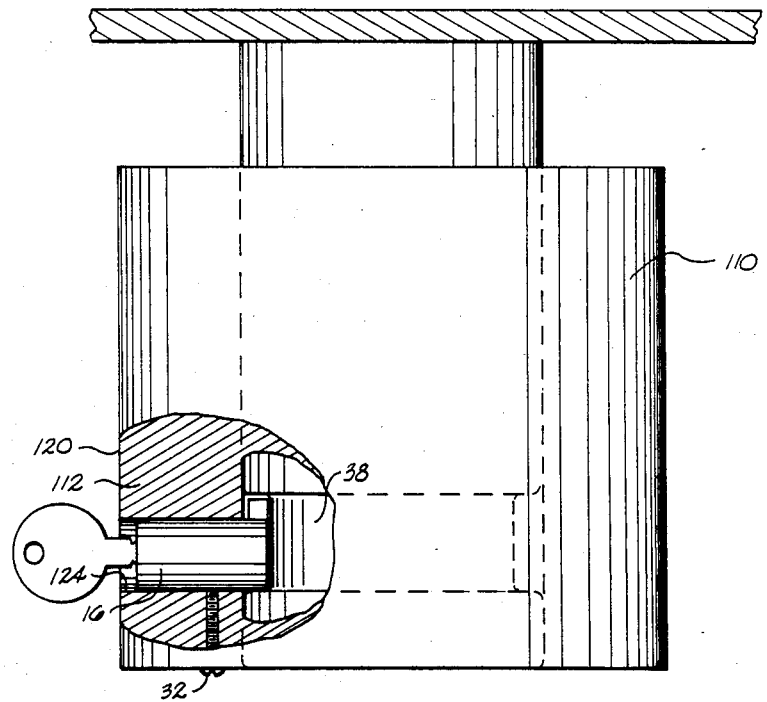
FIG. 4 is a side elevational view, with parts cut away, of an alternate embodiment of a king pin lock constructed in accordance with the present invention which does not require an outwardly projecting locking cylinder housing.

FIG. 4 illustrates an alternate embodiment of the present invention, king pin lock 110. King pin lock 110 has a thicker cylindrical sleeve 112 than does king pin lock 10. Because of the thicker cylindrical sleeve 112, the necessity of a locking unit housing is eliminated. Locking unit 16 is simply advanced to and from annular groove 38 within a radially extending bore 124. When locking unit 16 is fully inserted in annular groove 38, the rear end of locking unit 16 is flush with or even slightly indented from side wall 120 of cylindrical sleeve 112, thereby reducing the susceptibility of locking unit 16 from external blows delivered to king pin lock 110. Instead of having a thick cylindrical sleeve 112, nesting concentric cylindrical sleeves (not shown) could be provided which when combined have approximately the same outer diameter and inner diameter as sleeve 112.

A retaining bolt or screw 32 could be provided in the bore 124 of king pin lock 110, as is provided in housing 14 of king pin lock 10, to prevent locking unit 16 from rotating upon the insertion and turning of key 30 therein. Retaining bolt or screw 32 in king pin locks 10 and 110 allows, upon removal, for the locking unit 16 to be removed and replaced.

Alternate embodiment king pin lock 110 illustrated in FIG. 4 performs in the same manner as does king pin lock 10 to prevent unauthorized insertion of a trailer king pin into a fifth wheel coupling.

While a preferred embodiment of the invention has been described using specific terms, such description is for illustrative purposes only, and it is to be understood that changes and variations may be made without departing from the spirit or scope of the following claims.

What is claimed is:

1. A locking device receivable about an annularly extending groove defined in a trailer king pin for preventing insertion of the trailer king pin into a tractor fifth wheel coupling, comprising:

a substantially cylindrical sleeve having a substantially cylindrical interior surface defining a king pin-receiving opening therethrough receivable about the trailer king pin; said sleeve having a substantially cylindrical bore extending radially therethrough into said king pin-receiving opening;

a substantially cylindrical locking unit carried in said bore for radial sliding movement relative to said sleeve into and out of said king pin-receiving opening, said locking unit having an engagement end movable into and out of the annularly extending groove;

a substantially cylindrical locking unit housing surrounding said bore and extending outwardly from said sleeve for carrying said locking unit for sliding movement therein; and an extendable retaining pin provided in said engagement end of said locking unit, said retaining pin being radially extendable therefrom within said king pin-receiving opening for retaining, through contact with said substantially cylindrical interior surface of said sleeve adjacent the trailer king pin, said locking means in the annularly extending groove by preventing extraction of said locking unit through said bore, so that when said sleeve is received about the trailer king pin, said extendable retaining pin is receivable and outwardly extendable in said annularly extending groove defined in the king pin, and said locking unit is movable into the annularly extending groove and retainable therein by said extendable retaining pin.

2. The locking device as defined in claim 1, further comprising a substantially triangular support web extending substantially radially outward from said sleeve and spanning between said sleeve and said locking unit housing.

3. The locking device as defined in claim 1, further comprising a protective resilient casing enclosing the exterior of said sleeve and said locking unit housing for dampening and isolating from the locking device external forces delivered to said protective resilient casing.

4. The locking apparatus as defined in claim 1, wherein:

said locking unit includes a longitudinally extending groove; and said locking unit housing includes a projection for sliding insertion into said longitudinally extending groove; said projection preventing rotation of said locking unit within said locking unit housing.

5. The locking device as defined in claim 1, further comprising:

an endcap attached to said locking unit housing for retaining said locking unit within said locking unit housing; said endcap having an actuator opening through which said locking unit may be actuated.

6. A locking device receivable about an annularly extending groove defined in a trailer king pin for preventing insertion of the trailer king pin into a tractor fifth wheel coupling, comprising:

a substantially cylindrical sleeve having an interior surface defining a king pin-receiving opening receivable about the trailer king pin; said sleeve having a substantially cylindrical bore extending radially therethrough into said king pin-receiving opening;

a substantially cylindrical locking unit carried in said bore for radial sliding movement relative to said sleeve into and out of said king pin-receiving opening, said locking unit having an engagement end movable into and out of the annularly extending groove;

a key for actuating said locking unit;

a substantially cylindrical locking unit housing surrounding said bore and extending outwardly from said sleeve for carrying said locking unit for sliding movement therein;

retention means attached to said locking unit housing for retaining said locking unit within said locking unit housing; said retention means having a key opening through which said locking unit may be actuated by said key; and an extendable retaining pin carried by said engagement end of said locking unit, said retaining pin being radially extendable therefrom within said king pin-receiving opening for retaining, through contact with said interior surface of said sleeve adjacent the king pin, said locking means in the annularly extending groove by preventing extraction of said locking unit through said bore, so that when said sleeve is received about the trailer king pin, said extendable retaining pin is receivable and outwardly extendable in said annularly extending groove defined in the trailer king pin, and said locking unit is movable into the annularly extending groove and retainable therein by said extendable retaining pin.

* * * * *